United States Patent [19]
Davis

[11] Patent Number: 5,307,521
[45] Date of Patent: May 3, 1994

[54] PROTECTIVE DEVICE

[76] Inventor: Brian L. Davis, 827 Illinois Ave., Green Lake, Wis. 54941

[21] Appl. No.: 26,777

[22] Filed: Mar. 5, 1993

[51] Int. Cl.$^5$ ............................................ A41D 13/00
[52] U.S. Cl. .................................... 2/22; 2/16; 2/267; 602/5; 602/23
[58] Field of Search ............... 2/22, 224, 16, 23, 267, 2/268; 602/5, 20, 23, 26, 60, 61, 62, 63, 64

[56] References Cited

U.S. PATENT DOCUMENTS

| | | | |
|---|---|---|---|
| 930,740 | 8/1909 | Dean | 2/22 |
| 1,758,260 | 5/1930 | Knischewsky | 2/22 |
| 2,338,424 | 1/1944 | Giardini | 2/22 |
| 3,416,156 | 12/1968 | Marvid | 2/22 |
| 3,533,106 | 10/1970 | Kremp | 2/22 |
| 4,481,679 | 11/1984 | Hayes | 2/2 |

Primary Examiner—Clifford D. Crowder
Assistant Examiner—Gloria Hale
Attorney, Agent, or Firm—R. Jonathan Peters

[57] ABSTRACT

A protective device for a body part is formed of a pliable material and adaptable to conform to the body part to be protected. The device comprises a substantially planar member having an enlarged central portion with a depending lobe, and is adaptable to conform to and encircle at least partially a body part, the planar member having a body-facing surface and opposed exterior surface. A plurality of substantially parallel, spaced apart elongated ribs extend through the central portion and project from the exterior surface of the planar member. The planar member and ribs are formed integrally of a closed cell, cellular polymer and provided with an integrally formed, substantially nonporous, pliable skin on the exterior surface. Suitable fastening means releasably secures the device around the body part.

8 Claims, 2 Drawing Sheets

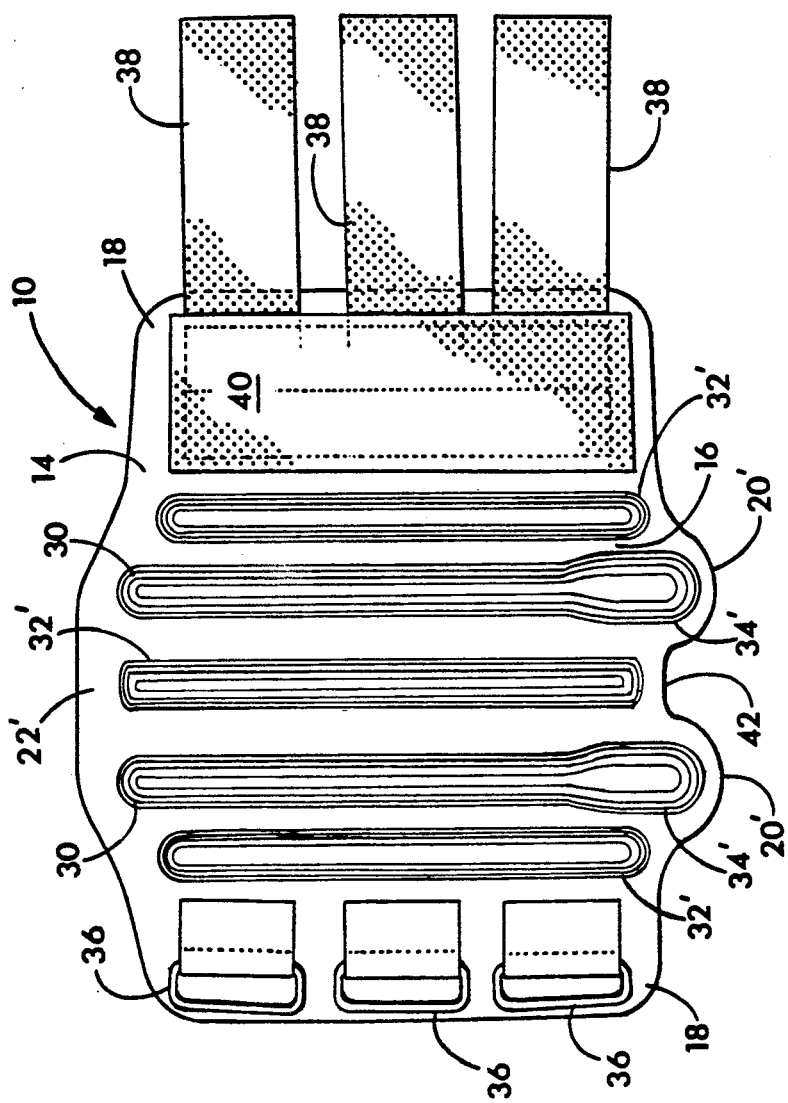
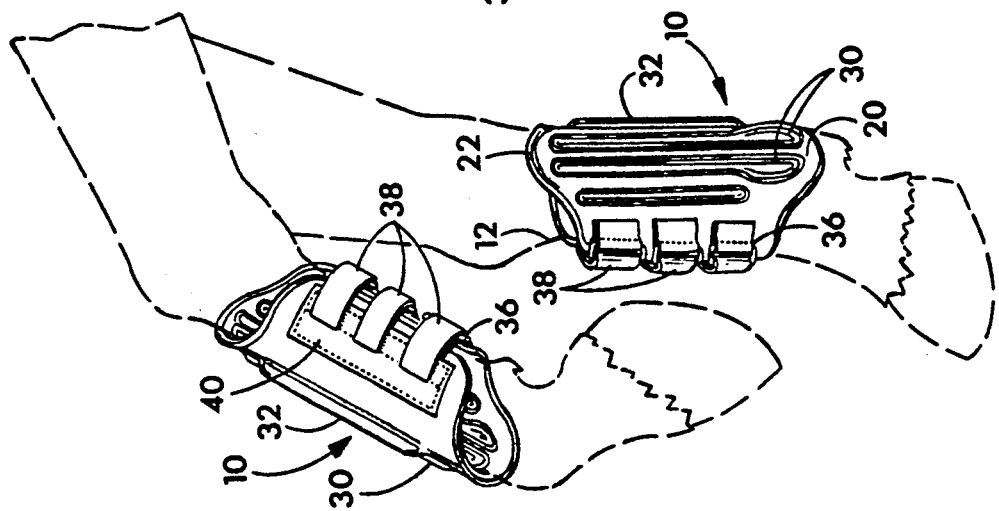
FIG. 4
FIG. 3

PROTECTIVE DEVICE

FIELD OF THE INVENTION

This invention relates to a protective device for a body part. In its more specific aspect, this invention relates to a protective device for animals or humans to protect a body part from damaging blows.

BACKGROUND OF THE INVENTION AND PRIOR ART

A number of protective devices have been developed to protect the body or a body part, e.g., legs, arms, chest, from a blow. Such protective gear has been designed for both animals and people. For example, horses have a tendency to strike the shin with an opposite hoof, and therefore it is desirable to protect the shins of the horse, especially of more expensive or thoroughbred horses such as show horses or race horse. Also, athletes are concerned about protecting the body from a blow or fall, or the athlete wants to protect a bruised part of the body. A number of references disclose padded guard devices such as for the torso or for body limbs and for both people and animals. These references include the following U.S. Pat. Nos.: 1,128,122; 1,184,868; 3,500,472; 3,533,1064, 099,269; 4,697,286; and 4,756,026. The protective devices disclosed include such features as elongated, padded ribs or cushioning ribs to provide added protection, which originally were formed of cotton batting but more recently of plastic or plastic foam. There is a strong need to provide improved devices of this type which readily conform to the body part and yet allow for ample mobility and provide adequate protection.

SUMMARY OF THE INVENTION

Generally, the protective device of my invention is formed of a pliable material adaptable to conform to and encircle at least partially a body part to be protected as from a blow, and comprises a body conformable panel having a body facing surface and an exterior surface or cover. The panel, being a substantially planar member, comprises an enlarged central portion with at least one depending lobe and fastening means for securing the device around the body part. A plurality of substantially parallel, spaced apart elongated ribs extend lengthwise of the central portion and project from the exterior surface of the planar member. The panel member and the ribs are formed integrally of a closed cell, cellular polymer. An integrally formed, substantially nonporous, pliable skin is formed as the exterior surface or cover. It will observed that because the panel and ribs are a soft foam polymer, the energy of the blow can be readily absorbed. Further, the ribs are encased or encapsulated by the panel and cover, and hence the ribs are formed of a soft foamed polymer, or desirably a foam softer than the panel, in order to provide the best protection to the wearer. The harder, nonporous cover is less subject to tearing, and protects the softer underlying components.

The construction of the protective device of this invention is particularly advantageous in that the ribs, which project outwardly, increase substantially the thickness to the device, thereby providing increased protection against a blow, while reducing the overall volume of material required in fabricating the device. In a preferred embodiment, one or more of the ribs are flared on at least one lateral side, thereby increasing the area or zone of protection. Still further, the lope can provide protection to a joint, such as the device having a downwardly depending lobe to cover an ankle joint on either side, but the reduced section of the panel would then fit to the ankle without interfering with the flexing of the joint.

A particularly useful polymer for both the panel and ribs a well as for the exterior cover is polyvinyl chloride, which for the panel and ribs can be provided with a foaming agent and readily foamed and fabricated into the desired configuration. The polymer for the exterior surface or cover has a durometer, measured as Shore "A" hardness, higher or harder than the polymer used for the panel as measured prior to foaming, and preferably higher by at least about 5 Shore "A" hardness.

BRIEF DESCRIPTION OF THE DRAWINGS

FIG. 3 is a perspective view of the protective device of FIG. 1 shown on the leg of a horse.

FIG. 4 is a front elevational view showing an alternative form of the protective device of the present invention.

DETAILED DESCRIPTION OF THE INVENTION

Figure 1:
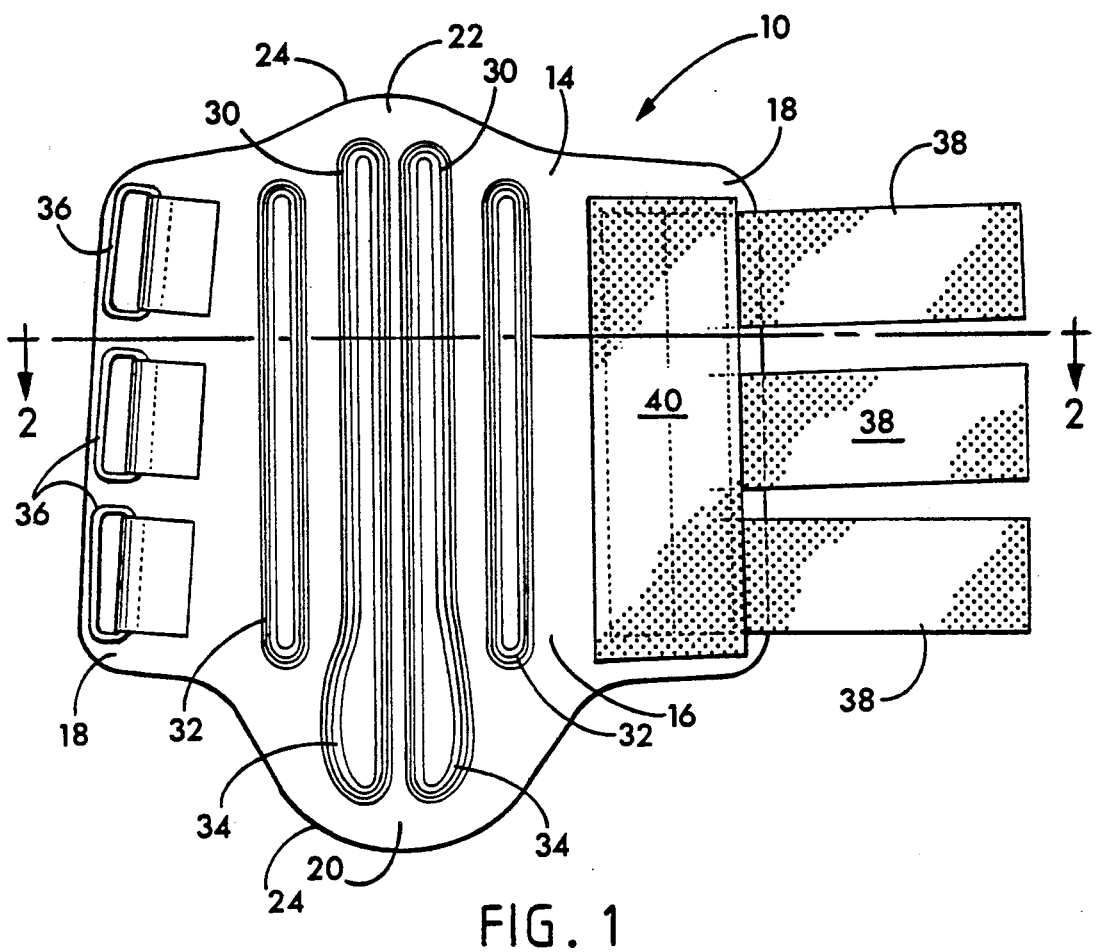
FIG. 1 is a front elevational view of a protective device in the form of a shin guard embodying the features of the invention.

Referring to the drawings wherein like numerals designate similar parts throughout the several views, there is shown in FIG. 1 a shin guard, indicated generally by the numeral 10, useful to protect the shin of a horse, but it should be understood that other body parts of both animals and human beings can be protected by the device of the invention. As illustrated, the protective device 10 fits predominately on the inside of the shin 12 (shown in phantom in FIG. 3), because horses have a tendency to strike themselves while trotting or running. In the case of an athlete, more typically protection is needed from a blow from other players as in the case of contact sports or from hitting the ground, and therefore the device would face predominately to the outside. The device comprises a panel member 14 of substantially rectangular configuration formed of a resilient, body conformable material described herein below, and having an enlarged central portion 16 as the predominant zone for providing protection to the wearer. The panel 14 includes opposed, transversely extending wings 18, and opposed depending lobes 20 and 22, each with an outwardly disposed arcuate or rounded contour 24, and formed integrally with the central portion. Preferably, the second lobe 22 is smaller in area than lobe 20, but the relative size between these two lobes can be varied, including being of substantially equal area, depending upon the end use. Where desired, this lobe 22 may be omitted and the marginal edge of the central portion in that region would be essentially straight. It will be observed that the lobes have an arcuate or convex contour 24 to protect a body joint but without substantially interfering with the flexing of that joint. It further will be observed that the lobes advantageously increase the area of the protective device in that zone where protection is most needed without encumbering the wearer's movements, and reduce the overall size and weight of the device by eliminating material where not needed. The panel member, being pliable, is conformable to the body part, e.g. shin, and has a body-facing surface 26 and exterior or exposed surface 28. Further, the panel member 14 is of sufficient size so as to cover or encircle at least that portion of the body part to be protected.

The protective device is provided with a plurality of substantially parallel, spaced apart ribs 30 and 32 extending lengthwise of the central portion 16 and disposed between the body-facing surface 26 and exterior surface or cover 28. Further, ribs 30 and 32 protrude or project from the exterior surface 28 in order to provide added or greater protection, as explained in more detail below, and the ribs may be substantially flush with or protrude slightly from the body-facing surface 26. In a preferred embodiment, the ribs are disposed longitudinally with reference to the longitudinal axis of the protective device when encircling the body part, such as shown in FIG. 3 where the ribs run longitudinally with respect to the longitudinal disposition of the device encircling the leg. This arrangement is advantageous in that the ribs afford a greater zone of protection to the limb. Where desired, however, the ribs may be disposed transversely with respect to the device as encircling a body part, which may be advantageous when used to protect a small portion only or a broad portion of a body part or limb. As illustrated in FIG. 1, the ribs extend substantially the complete length of the central portion 16, and the more centrally disposed ribs 30 extend into the lobes 20 and 22, but preferably the ribs terminate adjacent but spaced from the marginal edges of the panel and within the panel so as to be completely encased or encapsulated by the body-facing surface and exterior surface of the panel.

The panel and ribs are formed integrally of a closed cell, cellular polymer, described below in more detail, and are provided with an integrally formed substantially nonporous, pliable outer covering or surface 28. Because the components or members of the device are formed of pliable or resilient materials, the device is readily conformable to the body part to be protected. This is advantageous in that the device adapts to the contour of the body and fits against the body.

Figure 2:
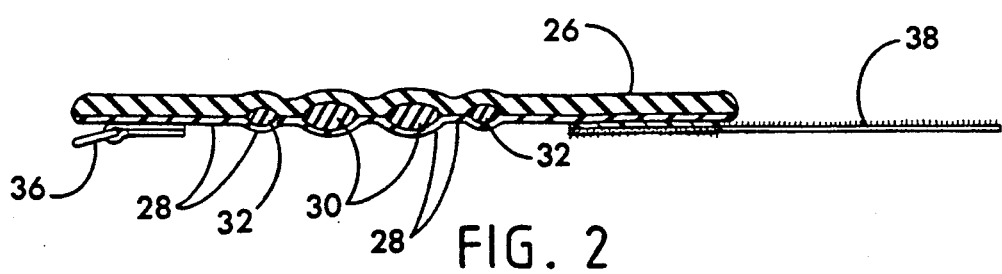
FIG. 2 is a sectional view on line 2—2 of FIG. 1.

One form of the protective device particularly useful as a shin guard for a horse as illustrated in FIGS. 1-3, shows the device with four longitudinally extending ribs 30 and 32. It will be observed that the centrally disposed ribs 30 are of substantially the same length, and the outwardly disposed ribs 32 are of substantially the same length. Further, ribs 30 extend nearly the full length of the central portion of the panel terminating at both ends within the lobe areas. Ribs 30 are flared at 34 on at least one lateral side, and preferably the flared portion is mainly within the lobe 20, in order to increase the protective zone provided by the ribs within the lobe area. The number of ribs 32 can be varied, as for example the panel could include one rib 32 to each side of ribs 30, as shown in FIG. 1, for a total of four ribs, or two or more ribs 32 to each side of rib 30 for a total of six ribs or more. The ribs 32, being of shorter length than ribs 30, terminate adjacent the lateral boundary between the central portion and the lobes. It is desirable to provide at least one central rib 30, and both lateral sides may be flared, and two outwardly disposed ribs 32, but more preferably the device includes two of each type of rib, but it should be understood that the number and length of ribs can vary depending on such factors as the overall size of the device and the end use. I have found, however, that usually there is no need to provide more than six ribs in total.

Suitable fastening means for releasably securing the protective device around the body part is illustrated in FIGS. 1 and 3. The closure means comprises a strap and at least one tightening element or D-ring 36 pivotally attached to one of the wings 18. The opposite wing is provided with hook and loop fastener elements such as of the VELCO fastener elements wherein strap 38 is provided on one surface thereof with one-half of the VELCRO, and the outwardly disposed surface of strip or panel 40 is provided with the complementary half of VELCRO. Tightening element 36 accommodates fastening strap 38 so that when strap 38 is drawn through element 36 and folded back, it can be joined in overlapping relation to the complementary fastening component 40. This fastening means holds the protective device in place and yet permits small adjustments. It is preferable to extend the panel substantially the full length of the side wing 18 as either the hook or loop part of the VELCRO fastener, because when the strap is drawn through the ring or buckle 36, the strap might be misaligned but nevertheless is fully attached to the panel. This elongated panel thereby facilitates fastening, which can be advantageous when trying to secure the device onto a horse or onto one's own arm.

The panel and ribs are formed of a closed cell, cellular polymer, which is body conformable and capable of absorbing energy when contacted and deformed by a blow. A preferred material is polyvinyl chloride, having incorporated therein a suitable foaming agent, all of which is well known in the art. The ribs can be formed of the same material or of a softer material than the panel. I have found for purposes of my invention that polyvinyl chloride having a durometer of approximately 35 Shore "A" (ASTM D-2240) before being foamed is particularly desirable for the ribs, and for the panel a durometer of about 50 Shore "A". The final durometer for a blown product, which is difficult to measure, depends largely upon the degree to which the foam is blown. It is desirable that the foam have a maximum blow ratio of about 2:1. Thus, the compressive behavior of the material depends on such factors as the polymer composition, density, and cell structure and size, but the optimum composition can be readily determined by one having ordinary skill in the art. Further, the outer covering 28 may be formed from a high viscosity polyvinyl chloride, desirably having incorporated therein heat and light stabilizers. This material found particularly useful has a durometer of approximately 55 Shore "A", a tensile strength of approximately 1375-1425 psi (ASTM D412), an ultimate elongation of about 425-435% (ASTM D-412), and a tear strength of about 140-150 lb/in (ASTM-1004). The outer layer or surface 28 is formed of a harder material to resist blows without tearing, while the inside or underside foam gives added protection. However, the underside panel should have sufficient strength or hardness so as not to tear apart which would happen if it were too soft, and the ribs may be formed of as soft a foam or softer foam because they are fully covered or encased for protection against tearing, and this softness provides additional protection to the body. A ribbed construction for the device as illustrated is particularly advantageous in that the ribs afford substantially greater thickness to the panel thereby providing increased protection, while making it possible to reduce the overall volume of material needed for the device. In addition, it is significant that because the ribbed construction allows for a reduction in thickness or volume of material, the device is more readily conformable to the body part.

There is illustrated in FIG. 4 and alternative embodiment of the invention showing a different arrangement of the ribs, and because this device typically is somewhat wider, it can be useful in covering or protecting a broader area, such as the upper arm of a person. As shown, panel 14 has a plurality of substantially parallel, spaced apart ribs 30' and 32', and downwardly depending lobes 20' which are spaced apart by marginal edge 42. Elongated, spaced apart ribs 30' extend between lobes 20' and 22', and have flared sections 34' mainly within lobes 20'. Interposed between ribs 30' and to each side of ribs 30' are the slightly shorter ribs 32'. It should be understood that the number of ribs and spacing may be varied, as explained above in the description of the other embodiment. In all other respects, the construction of this embodiment is substantially the same as with the above described embodiment.

It will be observed that by reason of my invention numerous advantages are achieved in providing a protective device for a body part for animals, particularly horses, and for humans. Further, it should be understood that the foregoing detailed description has been given for clearness of understanding only, and no unnecessary limitations should be understood therefrom, as modifications will be obvious to those skilled in the art.

What is claimed is:

1. A protective device adaptable to conform to and encircle at least partially a a limb of a human or animal to be protected and having a body-facing surface and an opposed exterior surface, comprising:
   (a) a body conformable panel having at least one depending lobe, and a plurality of substantially parallel, spaced apart ribs projecting from said exterior surface, each of said ribs being an elongated unitary member extending substantially the length of said panel and at least one of said ribs having a flared portion positioned mainly in said lobe; said panel and said ribs formed integrally of a closed cell, cellular polymer;
   (b) a substantially nonporous, pliable skin formed integrally with said panel and said ribs to provide the exterior surface thereof; and
   (c) fastening means extending from said panel for releasably securing said device around said body part, said fastening means comprising a plurality of hook and loop fastener elements wherein one of said elements extends substantially the full longitudinal length of said panel and spaced from and substantially parallel with said ribs.

2. A protective device according to claim 1 wherein said polymer for said exterior surface has a durometer of about 5 Shore "A" higher than said polymer for said panel.

3. A protective device according to claim 1 wherein said polymer is polyvinyl chloride.

4. A protective device according to claim 1 wherein said exterior surface is polyvinyl chloride.

5. A protective device according to claim 1 further comprising two ribs extending the full length of said panel and such ribs having a flared portion on opposed lateral sides thereof positioned mainly in said lobe, and at least one shorter rib positioned to either side of said full length ribs.

6. A protective device according to claim 1 wherein said lobe is contoured to a convex shape to cover a body joint of said body part without substantially interfering with the flexing of said joint.

7. A protective device according to claim 1 further comprising a second depending lobe at the opposed marginal end of said panel.

8. A protective device according to claim 7 wherein said second lobe is substantially smaller in area than said other lobe.

* * * * *